(12) United States Patent
Abediasl et al.

(10) Patent No.: US 10,962,718 B2
(45) Date of Patent: Mar. 30, 2021

(54) RECONFIGURABLE SPECTROSCOPY SYSTEM

(71) Applicant: ROCKLEY PHOTONICS LIMITED, Oxford (GB)

(72) Inventors: Hooman Abediasl, Pasadena, CA (US); Amit Singh Nagra, Altadena, CA (US); Andrew George Rickman, Marlborough (GB); Thomas Pierre Schrans, Temple City, CA (US); Pradeep Srinivasan, Fremont, CA (US); Andrea Trita, Pasadena, CA (US); Aaron John Zilkie, Pasadena, CA (US)

(73) Assignee: ROCKLEY PHOTONICS LIMITED, Oxford (GB)

( * ) Notice: Subject to any disclaimer, the term of this patent is extended or adjusted under 35 U.S.C. 154(b) by 0 days.

(21) Appl. No.: 16/867,372

(22) Filed: May 5, 2020

(65) Prior Publication Data

US 2020/0264377 A1    Aug. 20, 2020

Related U.S. Application Data

(62) Division of application No. 16/026,953, filed on Jul. 3, 2018, now Pat. No. 10,677,989.

(Continued)

(51) Int. Cl.
*G02B 6/293* (2006.01)
*G02B 6/35* (2006.01)
(Continued)

(52) U.S. Cl.
CPC ..... *G02B 6/29386* (2013.01); *G02B 6/29301* (2013.01); *G02B 6/3548* (2013.01);
(Continued)

(58) Field of Classification Search
None
See application file for complete search history.

(56) References Cited

U.S. PATENT DOCUMENTS

| 5,977,910 A | 11/1999 | Matthews |
| 10,584,372 B1 | 3/2020 | Aiyer |

(Continued)

FOREIGN PATENT DOCUMENTS

| CN | 111551914 A | 8/2020 |
| WO | 2019/007998 A1 | 1/2019 |

OTHER PUBLICATIONS

Notice of Allowance for U.S. Appl. No. 16/370,861, flied Mar. 29, 2019 on behalf of Rockley Photonics Limited. dated Apr. 14, 2020. 14 pages.

(Continued)

*Primary Examiner* — Jerry Rahll
(74) *Attorney, Agent, or Firm* — Steinfl + Bruno, LLP (57) ABSTRACT

A reconfigurable spectroscopy system comprises tunable lasers and wavelength lockers to lock to accurate reference wavelengths. Band combiners with differently optimized wavelength ranges multiplex the optical signal over the time domain, to emit a plurality of reference wavelengths for spectroscopy applications. The power requirements are greatly reduced by multiplexing over the time domain in time slots which do not affect sampling and receiving of the spectroscopy data.

4 Claims, 9 Drawing Sheets

Related U.S. Application Data (60) Provisional application No. 62/547,026, filed on Aug. 17, 2017, provisional application No. 62/528,936, filed on Jul. 5, 2017.

(51) Int. Cl.
*H01S 3/23* (2006.01)
*H01S 3/13* (2006.01)
*G01J 3/10* (2006.01)
*H01S 3/00* (2006.01)

(52) U.S. Cl.
CPC .......... *H01S 3/1307* (2013.01); *H01S 3/2391* (2013.01); *G01J 3/10* (2013.01); *H01S 3/005* (2013.01); *H01S 3/1305* (2013.01); *H01S 2301/02* (2013.01)

(56) References Cited

U.S. PATENT DOCUMENTS

| | | |
|---|---|---|
| 10,677,989 B2 | 6/2020 | Abediasl et al. |
| 10,739,256 B1 | 8/2020 | Rickman et al. |
| 2009/0116027 A1 | 5/2009 | Axelrod |
| 2015/0248047 A1 | 9/2015 | Chakraborty |
| 2016/0127044 A1* | 5/2016 | Ho .......................... H01L 14/02 398/79 |
| 2018/0039153 A1 | 2/2018 | Hashemi et al. |
| 2018/0136317 A1 | 5/2018 | Eldada |
| 2018/0188452 A1 | 7/2018 | Sun et al. |
| 2018/0252581 A1 | 9/2018 | Roulston et al. |
| 2019/0011639 A1 | 1/2019 | Abediasl et al. |
| 2019/0056634 A1 | 2/2019 | Hosseini et al. |
| 2019/0117109 A1 | 4/2019 | Grundfest et al. |
| 2020/0225554 A1 | 7/2020 | Gabbai |
| 2020/0333246 A1 | 10/2020 | Rockley |

OTHER PUBLICATIONS

Non-Final Office Action for U.S. Appl. No. 16/917,550, filed Jun. 30, 2020 on behalf of Rockley Photonics Limited. dated Sep. 9, 2020. 9 Pages.

Non-Final Office Action for U.S. Appl. No. 16/022,525, filed Jun. 28, 2018, on behalf of Rockley Photonics LTD. dated Jan. 22, 2021. 13 Pages.

Notice of Allowance for U.S. Appl. No. 16/917,550, filed Jun. 30, 2020 on behalf of Rockley Photonics Limited dated Dec. 15, 2020 8 pages.

* cited by examiner

RECONFIGURABLE SPECTROSCOPY SYSTEM

CROSS REFERENCE TO RELATED APPLICATIONS

The present application claims priority to U.S. patent application Ser. No. 16/026,953, filed on Jul. 3, 2018, which, in turn claims priority to U.S. Provisional Patent Application No. 62/528,936, filed on Jul. 5, 2017, and U.S. Provisional Patent Application No. 62/547,026, filed on Aug. 17, 2017, the contents of all of which are being incorporated herein by reference in their entirety.

TECHNICAL FIELD

The present disclosure relates to spectroscopy. More particularly, it relates to a reconfigurable spectroscopy system.

SUMMARY

In a first aspect of the disclosure, a device is described comprising: a plurality of tunable lasers generating a plurality of wavelengths; a plurality of wavelength lockers to reduce wavelength noise from the plurality of wavelengths and lock to a precise wavelength; a plurality of band combiners each configured to combine a different wavelength range than other band combiners of the plurality of band combiners; a plurality of switches, each switch receiving output of a corresponding band combiner of the plurality of band combiners, each switch outputting a plurality of switched wavelengths; a plurality of broadband combiners receiving outputs of the plurality of switches; and a plurality of emitters to emit a plurality of reference wavelengths, each emitter receiving output of a corresponding broadband combiner of the plurality of broadband combiners.

In a second aspect of the disclosure, a device is described comprising: a plurality of tunable lasers generating a plurality of wavelengths; a plurality of wavelength lockers to reduce wavelength noise from the plurality of wavelengths and lock to a precise wavelength; a plurality of band combiners each configured to combine a different wavelength range than other band combiners of the plurality of band combiners; a broadband combiner receiving outputs of the plurality of band combiners; an optical phased array switch comprising at least one arrayed waveguide grating; and a plurality of emitters to emit a plurality of reference wavelengths, each emitter receiving output of the optical phased array switch.

In a third aspect of the disclosure, a device is described comprising: a plurality of tunable lasers generating a plurality of wavelengths; a plurality of wavelength lockers to reduce wavelength noise from the plurality of wavelengths and lock to a precise wavelength; a plurality of band combiners each configured to combine a different wavelength range than other band combiners of the plurality of band combiners; a broadband combiner receiving outputs of the plurality of band combiners; a passive splitter configured to split an output of the broadband combiner; and a plurality of emitters to emit a plurality of reference wavelengths, each emitter receiving output of the passive splitter.

In a fourth aspect of the disclosure, a method comprising: generating a plurality of wavelengths by a plurality of tunable lasers; reducing wavelength noise from the plurality of wavelengths by a plurality of wavelength lockers; combining the plurality of wavelengths into wavelength ranges by a plurality of band combiners; switching the wavelength ranges by a plurality of switches; multiplexing over a time domain the plurality of wavelength ranges into a plurality of broadband combiners, each broadband combiner outputting to a corresponding emitter of a plurality of emitters; and emitting the multiplexed wavelengths by the plurality of emitters.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

The present disclosure describes a spectroscopy system which can be reconfigured according to the specific application. Several possible system architectures are described herein.

Figure 1:
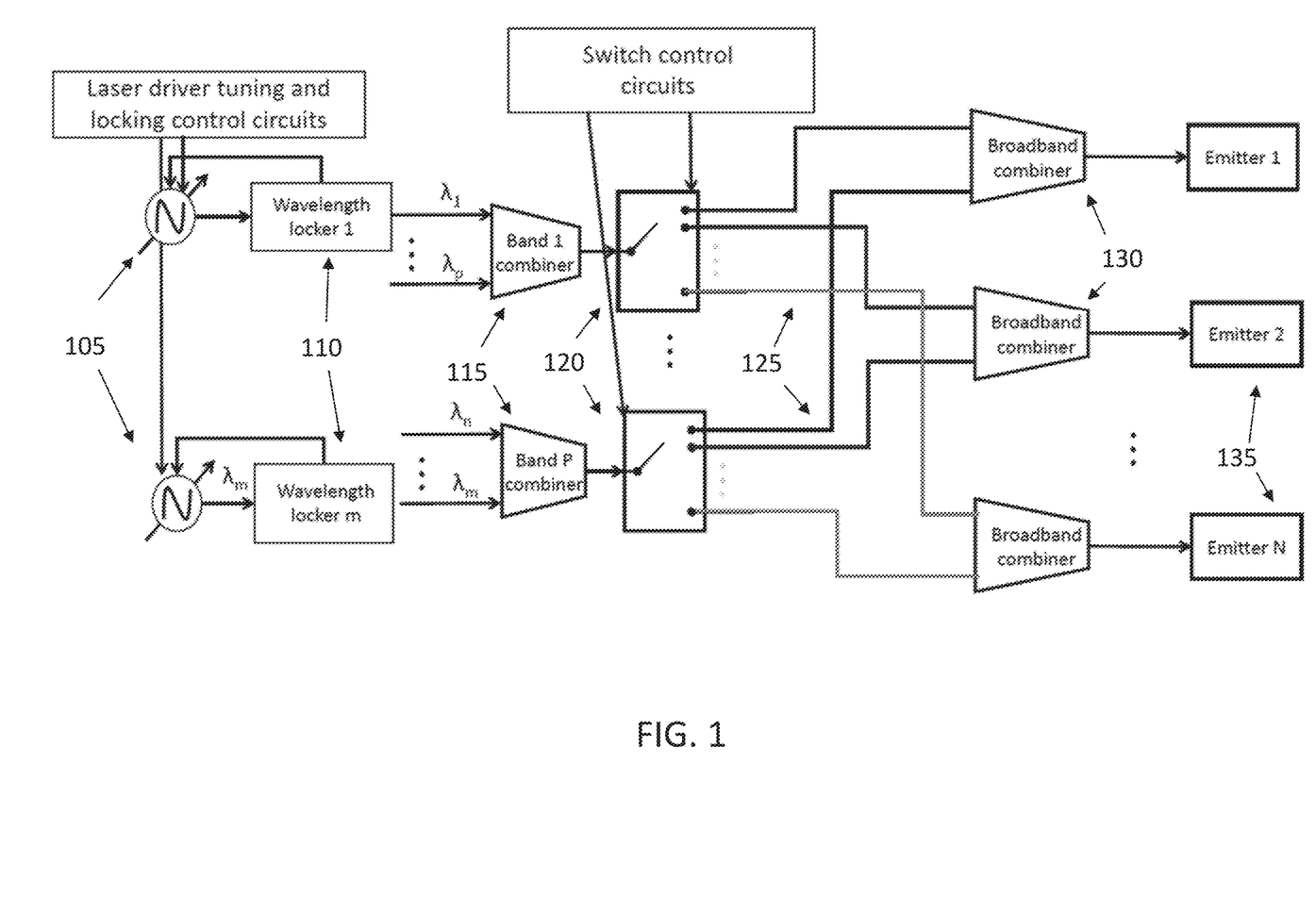
FIGS. 1-2 illustrate exemplary architectures for the spectroscopy system.

In FIG. 1, an exemplary architecture for the spectroscopy system is described. The system may comprise one or more lasers (105), each laser operating within a different wavelength range. The wavelength ranges may be entirely distinct, or have a degree of overlap with each other. The lasers in FIG. 1 may be tunable. Each of the lasers (105) may incorporate a wavelength locker (110). In some embodiments, the wavelength locker operates with a feedback circuit. The wavelength lockers eliminate phase noise and can be implemented in different ways. The wavelength lockers can lock a wavelength into an accurate reference wavelength by controlling the wavelength variations. The lasers may be controlled by a driver circuit which can control the laser tuning as well as the wavelength lockers. The control circuitry may be located on the same chip of the photonic components (e.g. the wavelength lockers) or may be located in a separate chip, e.g. a complementary oxide semiconductor (CMOS) chip. The wavelength lockers allow a stable operation with "clean" wavelengths. Downstream to the wavelength lockers (110), a plurality of well defined, distinct wavelengths is therefore available. These different wavelengths may be combined in a plurality of band combiners (115), followed by one or more switches (120).

The switches (120) can switch the photonic signal between different output waveguides and feed each wavelength band to different emitters (125). This implementation allows the system to scan across wavelengths. For example, the switches (120) can multiplex the wavelength in the temporal domain, by alternating over time between each wavelength. In some embodiments, the different wavelength bands (125) can be combined by broadband combiners (130). Each of the broadband combiners can multiplex the wavelengths to a single waveguide that is feeding one emitter. In some embodiments, multiplexing over the time domain is carried out with a very small interval, e.g. of the order of milliseconds per wavelength. If the application does not require fast sequencing, the sample illuminated by the spectroscopy system is effectively scanned by a plurality of wavelengths, with no perceivable difference compared to a system that would illuminate the sample simultaneously at each wavelength. To illuminate the sample with each wavelength simultaneously, the overall power of the system is necessarily split into a number of emitters. Therefore, the power available, per channel, is less than that available if the wavelengths are scanned over time. With wavelength multiplexing, the system can effectively analyze a sample with the same number of wavelengths of a simultaneous-wavelengths system, but with greatly increased power efficiency.

In some embodiments, each wavelength is emitted one at a time. In other embodiments, a subset of wavelengths is emitted simultaneously, and the emitters sequence each wavelength of the subset over time, effectively multiplexing a varying subset of wavelengths. In yet other embodiments, both modes of operation can be applied sequentially or according to the specific application. In the exemplary system of FIG. 1, following the broadband combiner, the resultant multi-wavelength photonic signal is then transmitted to a plurality of emitters (135). In some embodiments, the emitters (135) form one or more optical phased arrays.

The band combiners (115) may operate, in some embodiments, within a wavelength range of about 100 nm. The 1×N switches (120) may be optimized to operate within their respective wavelength bands of operation. For example, the first switch may be optimized to operate in a first wavelength band, while the second switch may be optimized to operate in a second wavelength band different from the first wavelength band—either entirely distinct or overlapping. In other words, each band combiner can be optimized to efficiently combine the wavelengths comprised in its distinct operational wavelength range. The broadband combiners (130) may have an operating wavelength range of about a few micrometers. In this embodiment, each band combiner would receive wavelengths in its operational range from the tunable lasers.

FIG. 1 therefore illustrates an exemplary spectroscopy emitter system utilizing a plurality of wavelength (frequency) lockers after the input lasers, to clean the signal of phase noise, followed by a set of band combiners. Each band combiner combines a subset of the input lasers based on a wavelength band (for example, 100 nm range), followed by a set of controlled switches (one per band combiner) that control which bands go into which broadband combiner. The broadband combiners combine the wavelength bands that are fed into them, and are followed by a set of emitters to emit light of the combined bands. The switches allow controlling which bands are sent to which emitters in a time-division multiplexing manner. For example, the emitters can emit all bands at the same time, and then selectively emit only a subset of bands, or a single band, at different times. The emitters can also differentially emit the wavelength bands in the time domain through the use of the switch control circuits. The control circuits can be realized in a photonic chip (e.g. silicon) or in a chip together with the CMOS control circuitry, with the other components. Alternatively, the photonic and CMOS chips may be separated.

Figure 2:
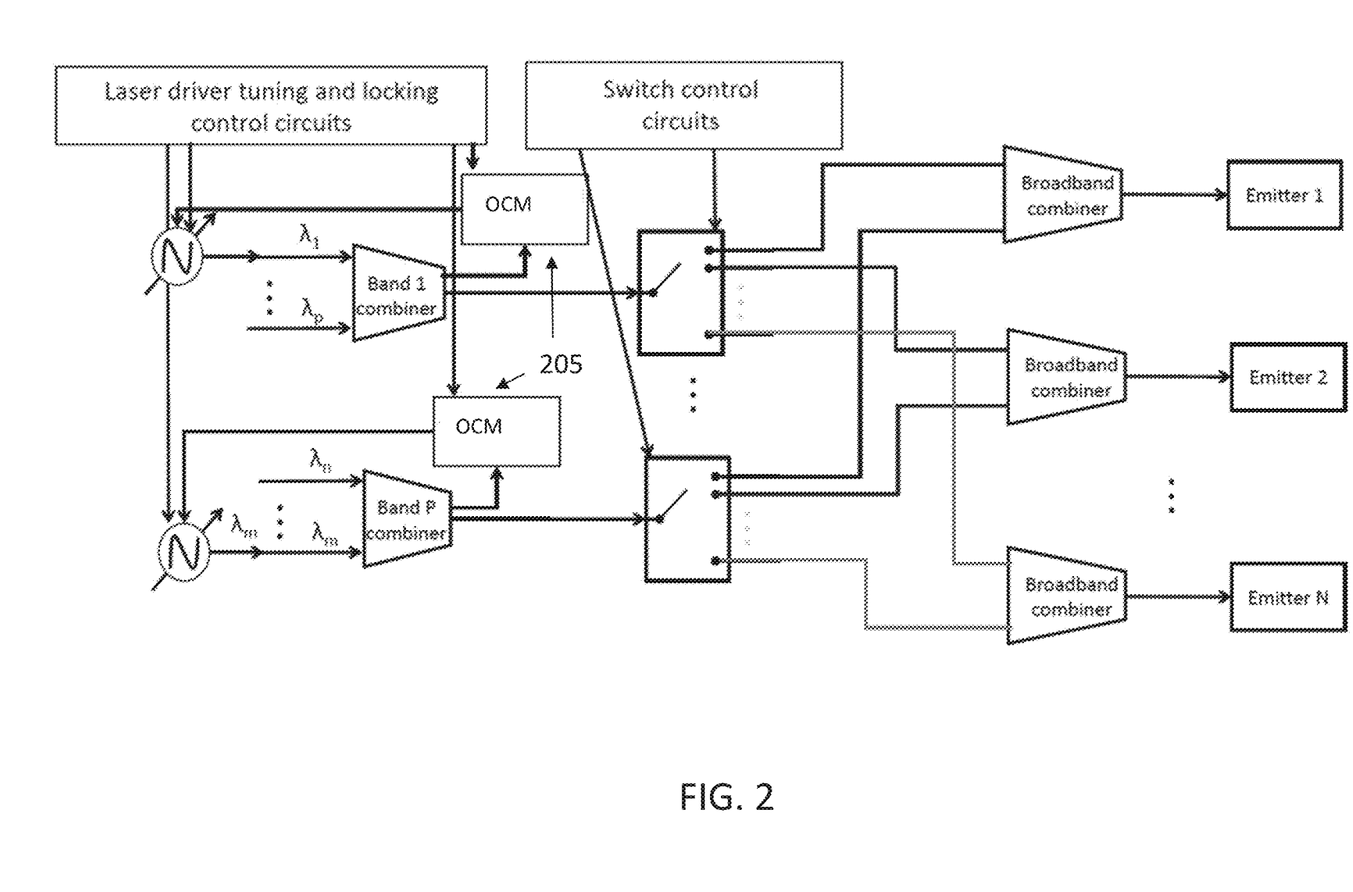

In other embodiments, as illustrated in FIG. 2, a plurality of optical channel monitors (OCM) (205) may be used to monitor the output of the band combiners, and provide feedback control to the plurality of lasers. Therefore, in the embodiment of FIG. 1, a wavelength locker is used right after the laser, while in the embodiment of FIG. 2, an optical channel monitor is used after the band combiner. Wavelength locking can therefore be accomplished through the wavelength lockers or by using optical channel monitors (OCM) after each band combiner. In some embodiments, the OCMs may be combined with the broadband combiner. In this case, a feedback path would trace back to the lasers from the switches instead of from the OCMs. In some embodiments, the optical channel monitor may require a lower number of components, compared to the implementation with a wavelength locker. The photonic circuits may be controlled by a separate CMOS chip, for example.

Figure 3:
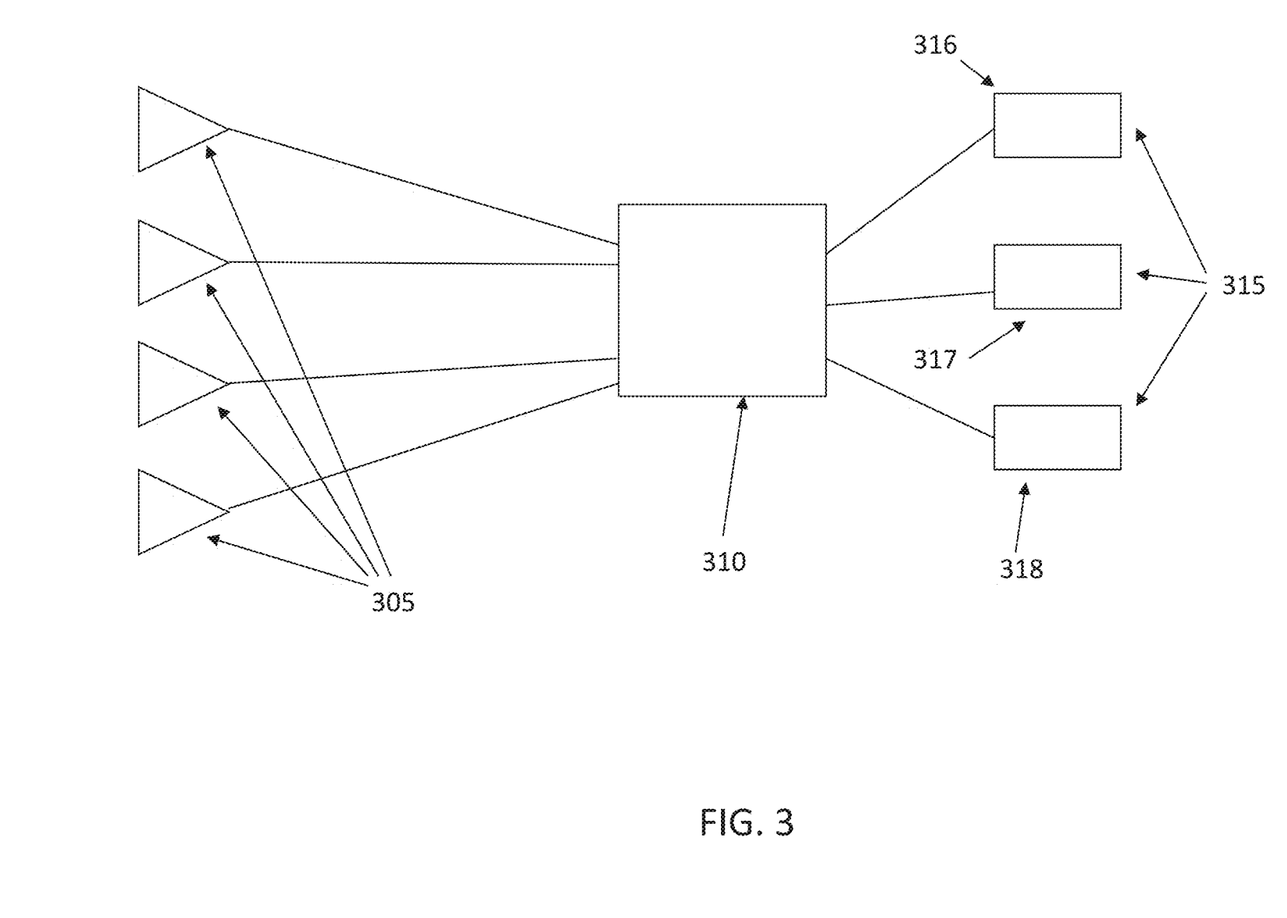
FIG. 3 illustrates an exemplary transmitter architecture for the spectroscopy system.

FIG. 3 illustrates an exemplary transmitter architecture for the spectroscopy system of the present disclosure. A plurality of lasers (305) generates a plurality of wavelengths $\lambda_1$-$\lambda_N$. These wavelengths can be combined at a switch (310) similarly as described in FIGS. 1-2. For example, laser 1 may operate in the wavelength range $\lambda_1$-$\lambda_{10}$, laser 2 within $\lambda_{11}$-$\lambda_{20}$, and so on. These wavelengths may be combined so that, for example, each of the four pathways between (305) and switch (310) carries a specific wavelength range—e.g. $\lambda_1$-$\lambda_{10}$, $\lambda_{11}$-$\lambda_{20}$, $\lambda_{21}$-$\lambda_{30}$ and $\lambda_{31}$-$\lambda_{40}$. After the switch (310) the optical signals are sent to a plurality of emitters (315). In some embodiments, the switch (310) may have a limited optical bandwidth. In this case, not all wavelengths are sent to the same emitter at the same time, but the wavelengths are rather multiplexed over time. Therefore, the system switches wavelength bands between emitters in the time domain to improve the link budget.

For example, emitter 1 (316) may receive range $\lambda_1$-$\lambda_{10}$ at time interval $t_1$, while emitter 2 (317) may receive range $\lambda_{11}$-$\lambda_{20}$ at time interval $t_1$ and emitter 3 (318) may receive range $\lambda_{21}$-$\lambda_{30}$ at time interval $t_1$. Emitter 3 may then receive range $\lambda_{11}$-$\lambda_{20}$ at time interval $t_2$, and range $\lambda_1$-$\lambda_{10}$ at time interval $t_3$. The switch can direct each of n wavelength ranges to the designated emitter (of n emitters), according to a time distribution. For example, in the time interval $t_m$, emitter 1 may receive range $\lambda_{11}$-$\lambda_{20}$, emitter 2 may receive range $\lambda_{21}$-$\lambda_{30}$, while emitter 3 may receive range $\lambda_{31}$-$\lambda_{40}$ and emitter n may receive range $\lambda_1$-$\lambda_{10}$. In this way, 1×N switches can be used to improve the link budget of the spectroscopy system by time-sharing the band power between N emitters. Each switch can be optimized to perform efficiently within its wavelength band. In some embodiments, the switch can therefore emit a number of pulses to each emitter. Different implementations can be realized for the sequence of wavelengths at the emitters. For example, all emitters may receive the same wavelength band in the same time slot, or each emitter may receive the same band at subsequent time slots. For example, each emitter may receive a different band in the same time slot, and the same band may shift over time over the different emitters.

In some embodiments, multiple emitters might be used to increase the effective illumination area, to cover a wide field of view, and capture a wide area of a spectroscopy sample.

In the architecture of FIG. 1, each emitter may see a different set of wavelengths in each timeslot (including no wavelength if no signal is transmitted to the emitter for that timeslot). In some embodiments, the broadband combiners could be optional. FIG. 3 illustrates an exemplary architecture without the broadband combiners. In some embodiments, the emitters are configured to emit at all wavelengths over several time slots. The emitters may be configured to form one or more optical phased arrays.

Figures 4A, 4B:
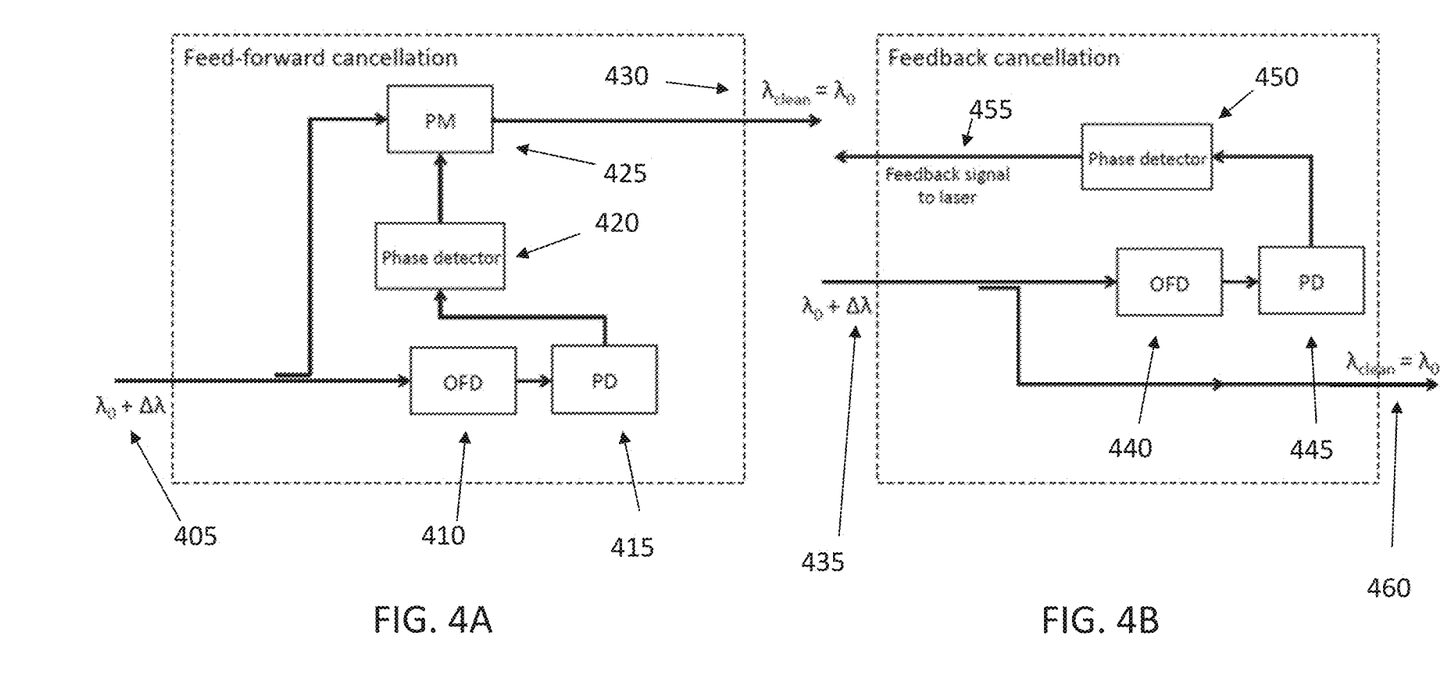
FIGS. 4A and 4B illustrate two exemplary implementations for adjusting the wavelength after the lasers.

FIGS. 4A and 4B illustrate two exemplary implementations for cleaning (i.e. wavelength locking) the light of the lasers: a feed-forward cancellation method (FIG. 4A) and a feedback cancellation method (FIG. 4B).

The feed-forward cancellation can comprise a phase modulator (425, PM), a phase detector (420), an optical frequency discriminator (410, OFD), and a photodiode (415, PD). In the feed-forward method, the wavelength noise can be designated as a Δλ deviation from the desired wavelength $\lambda_0$. The wavelength noise from a split-off portion of the laser signal (405) is converted from the frequency domain into the intensity (amplitude) domain by a discriminator (410), the output of which is then converted into an electrical signal by a photodiode (415). This signal is input into a phase detector (420) which detects the frequency (phase) deviation. The phase detector, in turn, drives a phase modulator (425) to adjust the original signal (405) to remove the noise, thereby obtaining a clean wavelength (430) (i.e. equal to the desired wavelength/frequency).

In the feedback method, a split-off portion of the noisy signal (435) is input to a discriminator (440) and then a photodiode (445), similarly to the feed-forward method. The phase detector (450), however, sends a feedback signal (455) to the laser. The laser can tune itself, based on the feedback, to correct the output signal (460) to match the desired wavelength/frequency. In some embodiments, therefore, the system may have a short starting time, after it is turned on, during which the laser wavelengths are being adjusted. Other means of wavelength (or frequency) locking are known in the art and can also be utilized. In some embodiments, the feed-forward implementation may have a smaller wavelength range correction compared to the feedback implementation. However, the feed-forward implementation has the advantage of not having to control the laser by itself. Implementing the appropriate laser controls may introduce additional complexity in the system. The trade-offs between the two implementations may favor one over the other depending on the specific embodiment of the system.

The number (m) of input lasers in the spectroscopy system can be large. For example, there can be over 100 input tunable lasers. The number of emitters (N) can be independent of the number of input lasers (m). Likewise, the number of band combiners (P) can be independent of the number of emitters (N) and the number of input lasers (m). Approximate values given in the text and drawings are examples—other values can be utilized as understood by the person of ordinary skill in the art.

Figure 5:
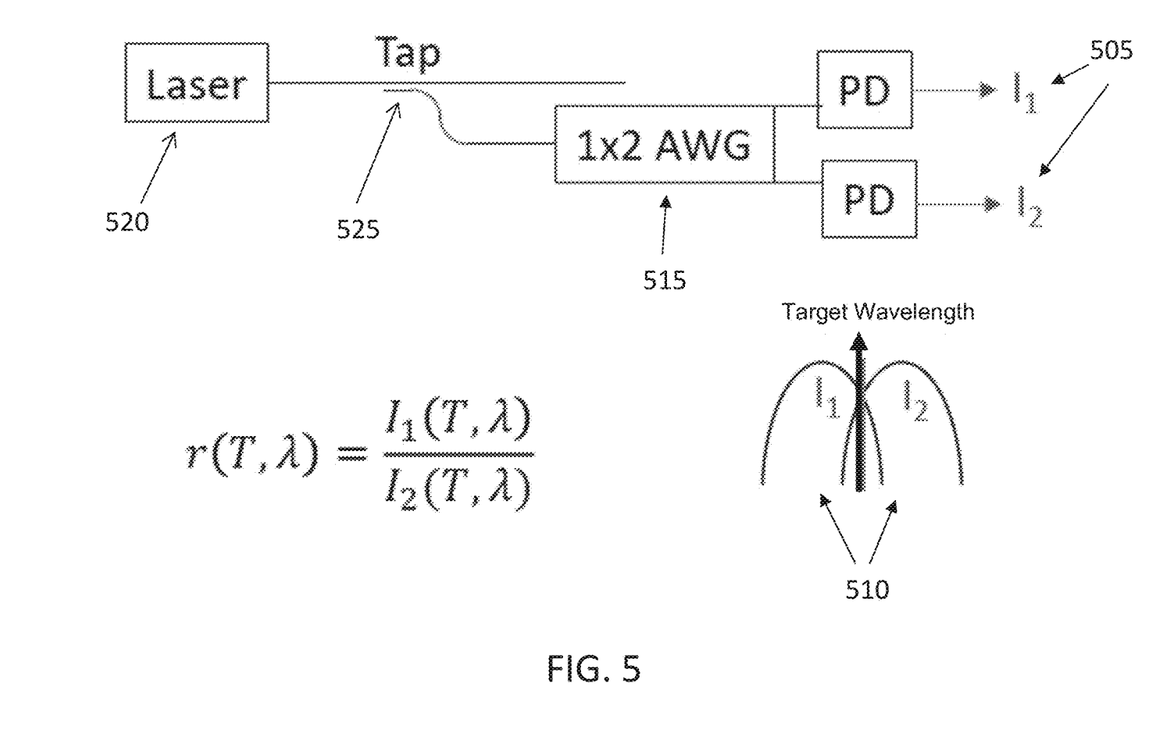
FIG. 5 illustrates an example of operation of a wavelength locker based on an arrayed waveguide grating (AWG).

FIG. 5 illustrates the operation of an arrayed waveguide grating (AWG) wavelength locker for a system implementation comprising optical channel monitors. Arrayed waveguide gratings (AWG) are commonly used as optical (de) multiplexers in wavelength division multiplexed (WDM) systems. These devices can multiplex a large number of wavelengths into a single optical fiber or waveguide, thereby considerably increasing the transmission capacity of optical networks. In an AWG, the incoming light traverses a free space and enters a bundle of arm waveguides. The waveguides have different lengths and thus apply different phase shifts at their exit. The light then traverses another free space and interferes at the entries of the output waveguides in such a way that each output channel receives only light of a certain wavelength.

FIG. 5 illustrates an exemplary method to lock a wavelength. The laser light (520), after a tap (525), is split into two wavelengths by the AWG (515). The ratio of the two electrical signals derived from the two wavelengths is monitored and kept constant. In turn, this allows effective locking of the laser's wavelength. In FIG. 5, the output currents $I_1$ and $I_2$ (505) of two photodiodes (PD) are monitored so that their ratio is kept constant. This implementation aims at keeping the ratio between the two currents as close to 1 as possible. As a consequence, the peaks (510) are kept at the same intensity and the optical signal is kept centered at the target wavelength. The ratio is a function of temperature, but the temperature dependency can be taken into account and calibrated, for example through a lookup table or using temperature-independent reference devices (e.g. a thermal AWG). In other words, locking a wavelength removes drifts due to temperature and fabrication process variations. The temperature's fluctuations can be controlled more easily than in other implementations, because the AWG is a passive component. In other words, the AWG does not have active power requirements which entail heat generation from power consumption. Therefore, it can be easier to control temperature fluctuations in an AWG as a passive component. Additionally, an AWG does not require recalibration, and it is scalable, in that the original signal can be split not only in two wavelengths, but also in a plurality of wavelengths. In some embodiments, it is also possible to implement a similar technique without having symmetrical peaks (510).

Alternatively, the ratio between currents can be used as a wavelength discriminator, converting changes in wavelength to changes in power (intensity). In FIG. 5, an exemplary AWG (515) has 1 input and 2 outputs. The system of FIG. 5 can be used as an optical channel monitor (OCM) in the spectroscopy system of the present disclosure.

The AWG channel spacing and crosstalk can be designed so that the necessary dr/dλ (e.g. dλ<5 pm) is obtained for the control loop signal-to-noise (SNR) ratio, where r is the ratio, which is a function of temperature and wavelength. In other embodiments, structures other than an AWG may be used, to provide two wavelength-dependent outputs.

Figure 6:
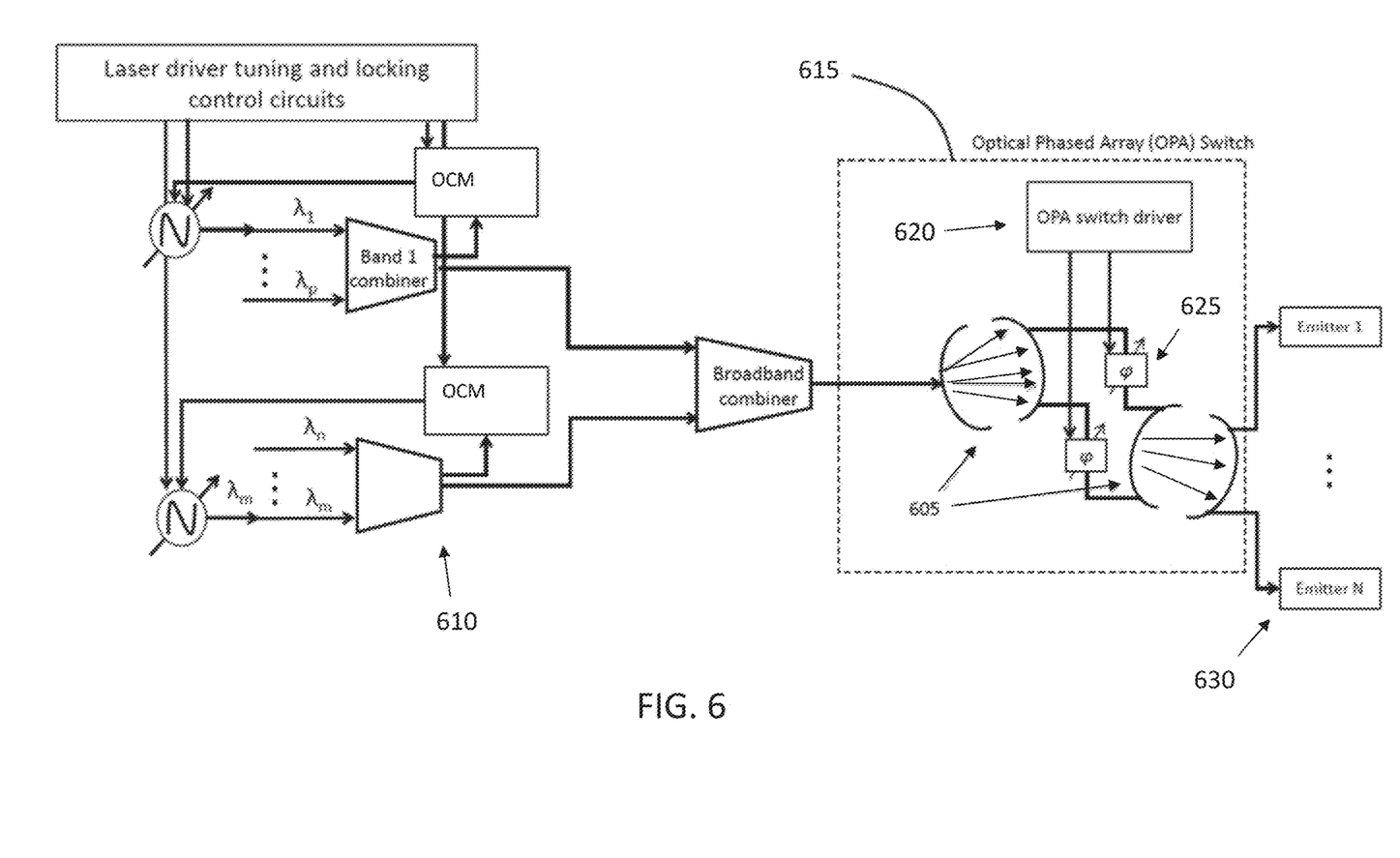
FIG. 6 illustrates an example spectroscopy system where an AWG configuration with active phase shifters is used to switch (steer) wavelengths to different emitters.

FIG. 6 illustrates a spectroscopy system where an AWG configuration with active phase shifters is used to steer wavelengths to different emitters. A system comprising lasers, optical channel monitors and band combiners is illustrated (610), similarly as in FIG. 2. FIG. 6 also illustrates an optical phased array switch (615), comprising a switch driver (620), phase modulators (625), AWGs (605) and a plurality of emitters (630). There can be a performance trade-off between operational wavelength band and power loss of the switch of FIG. 6, compared with a simple passive 1:N splitter.

In modules (605), the different wavelengths are distributed by using an AWG. In some embodiments, the beam emitted by each emitter has a constant spatial divergence (i.e. emission angle) within the wavelength range used by the spectroscopy system. Therefore, in some embodiments, each emitter will emit at the same emission angle for each wavelength. In some embodiments, the 1:N AWG has arms with equal lengths. The embodiment of FIG. 6 may not be as effective in power management as the embodiments of FIG. 1 or 2, however it may still deliver a higher power efficiency than other systems without any switch. In FIG. 6, the active switch can steer all available power to one emitter at a time. If the switch is sufficiently fast, the receivers are not affected by the time-multiplexing of the power over the available emitters. The added complexity of the switch is counteracted by the reduction in power usage.

Figure 7:
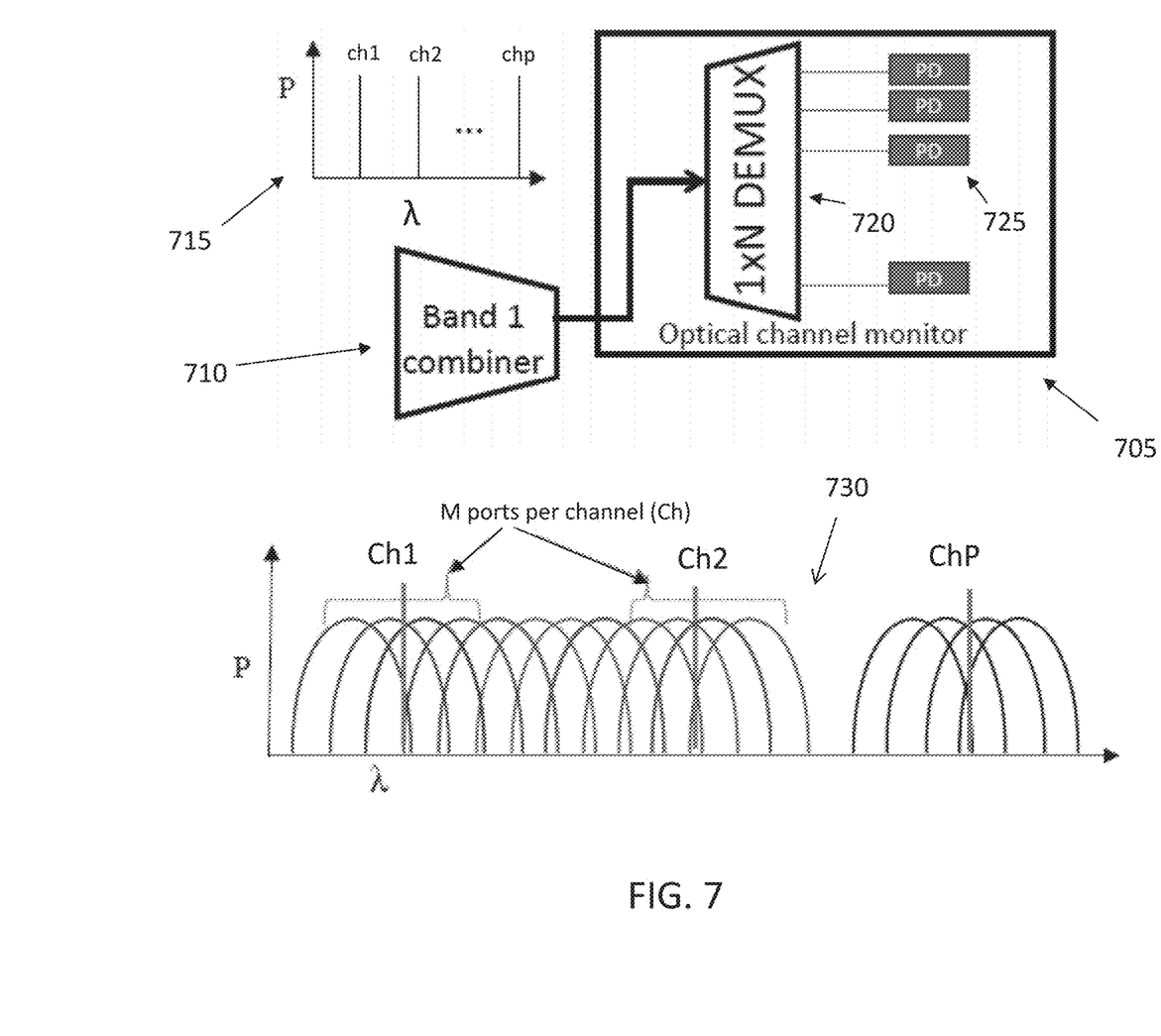
FIG. 7 illustrates an example AWG-based multi-channel wavelength locker.

FIG. 7 illustrates an AWG-based multi-channel wavelength locker. In FIG. 7, the optical channel monitor (705), following a band combiner (710), can demultiplex the wavelengths. A 1×N demultiplexer (720) is followed by multiple photodiodes (725), one diode per channel. FIG. 7 also illustrates (715) how each channel is centered at one wavelength. In some embodiments, the optical channel monitors of FIG. 2 can be implemented as described in FIG. 7. An example of such system is described, for example, in M. Muneeb et al., Optics Express, vol. 22, no. 22, p. 27300 (2014), the disclosure of which is incorporated by reference in its entirety.

The 1×N demultiplexer (720) covers the same optical bandwidth as the band combiner (710), but has M times as many output ports and a spacing between the channels that is M times smaller. The demultiplexer can be intentionally designed to have large nearest-neighbor crosstalk. The AWG channel spacing and crosstalk can be designed so that the necessary dr/dX, (e.g. $d\lambda < 5$ pm) is obtained for the control loop signal-to-noise (SNR) ratio. In other embodiments, structures other than AWG may be used, to provide two wavelength-dependent outputs. The operation of the AWG is a function of temperature but this dependency can be calibrated and taken into account, for example through a lookup table. Another advantage of the AWG is a reduced area requirement and reduced loss.

The technique of FIG. 7 is an expansion to multiple wavelengths of the technique of FIG. 5, as well as using more than two ports per channel (locked wavelength). In FIG. 5, the ratio between two currents is monitored and kept constant in order to lock one wavelength. In FIG. 7, multiple wavelengths (channels, "ch") are locked, to allow the controlled emission of multiple wavelengths for spectroscopy applications. As illustrated in FIG. 7 (730), each channel comprises a number of ports. The more ports used, the greater the accuracy of the lock. A plurality of reference wavelengths are kept locked. These locked reference wavelengths are output at the emitters. This technique relies on the fact that the ratio is a more sensitive output. By having multiple ports in each channel (each channel corresponding to a reference wavelength) it is possible to increase the locking accuracy. In other words, the accuracy in keeping the reference wavelength constant is increased compared to the approach of FIG. 5, where the ratio of two quantities is monitored. Additionally, by decreasing the sensitivity of the reference wavelengths to parameters (such as temperature) the accuracy of the reference wavelengths is improved. In some embodiments, the overlapping point between adjacent peaks in FIG. 5 and FIG. 7 has the greatest slope and therefore the greatest sensitivity to fluctuations.

Figure 8:
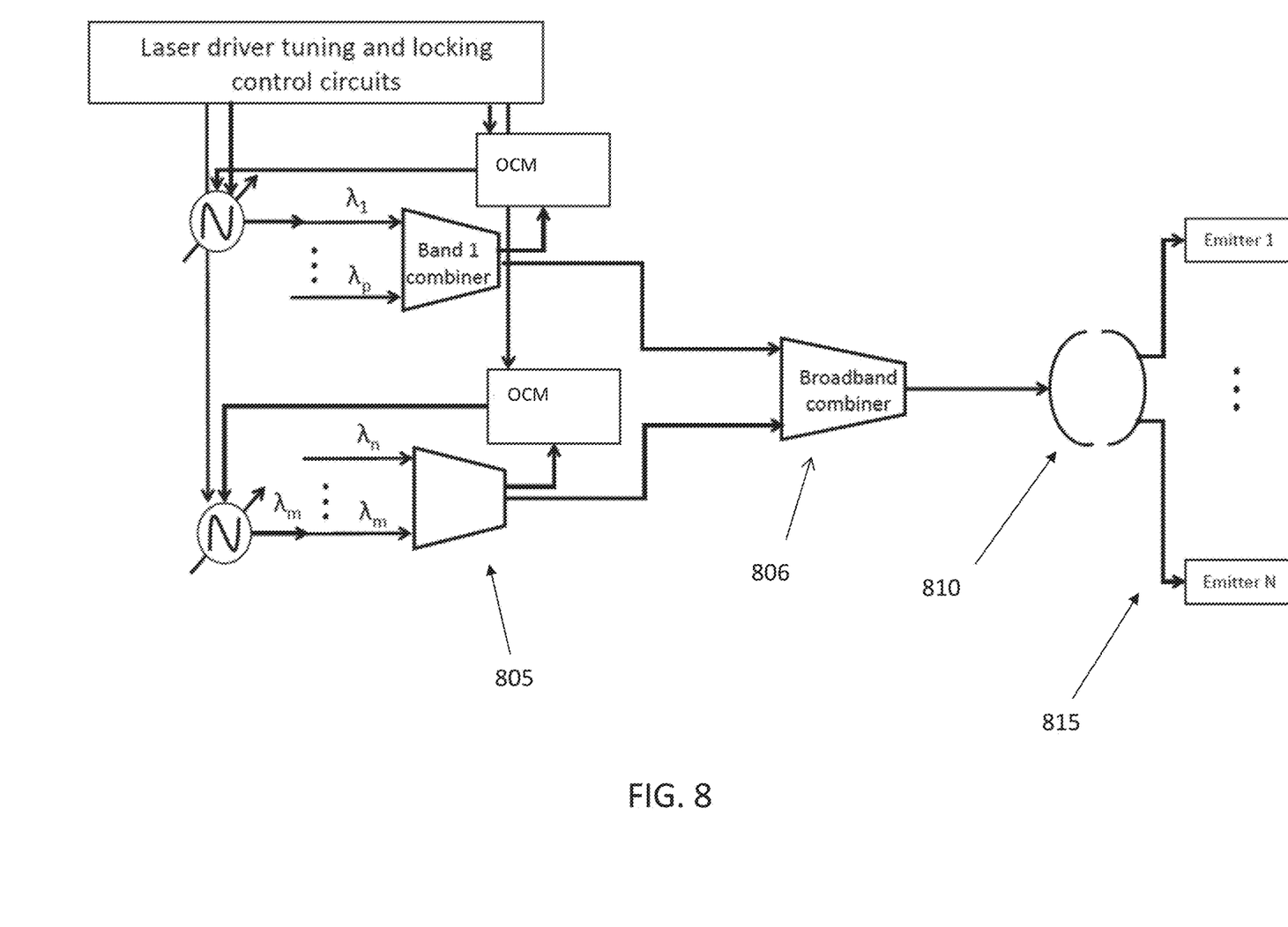
FIG. 8 illustrates an example implementation based on a passive splitter after the broadband combiner.

FIG. 8 illustrates an implementation based on a passive splitter (810) after the broadband combiner (806). In this embodiment, each emitter (815) receives all wavelengths. The system (805), implemented with optical channel monitors similarly as in FIG. 2, comprises a passive splitter (810) instead of an AWG. In this embodiment, the emitters (815) each receive all wavelengths simultaneously through the 1:N splitter (810). In FIG. 8, there is no switch, and therefore no time-domain switching. As a consequence, a 1/N loss of power is present when compared to a switched embodiment.

Figure 9:
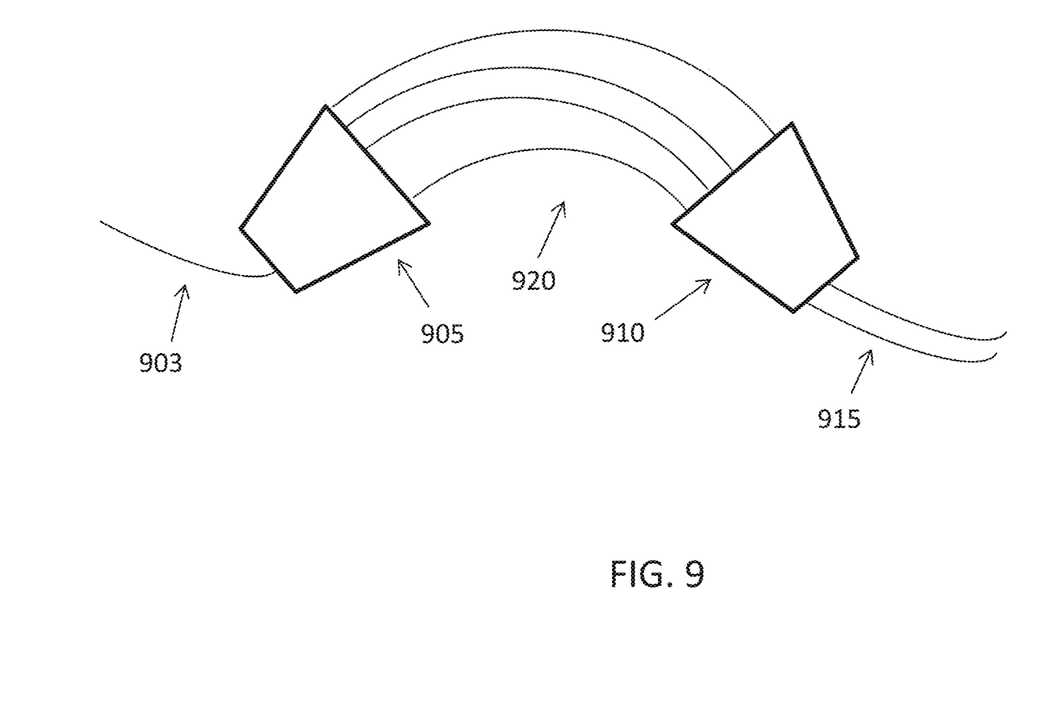
FIG. 9 illustrates an exemplary schematic of an AWG.

FIG. 9 illustrates an exemplary schematic of an AWG. An optical signal from input waveguide (903) enters a free propagation region (905), and is split into arrayed waveguides (920), followed by another free propagation region (910). Interference within (910) allows the output (915) to provide a plurality of different wavelengths. Therefore, the AWG in FIG. 9 demultiplexes the wavelengths, splitting them into a plurality of defined wavelengths (915).

In FIG. 1, the modules controlling the wavelengths are termed wavelength lockers, while in FIG. 2 the modules are termed OCM. However, either type of module may generally be termed wavelength locker in the present disclosure.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

1. H. Abediasl and H. Hashemi, "Monolithic optical phased-array transceiver in a standard SOI CMOS process," Optics Express, vol. 23, no. 5, pp. 6509-6519, March 2015.
2. S. Chung, H. Abediasl and H. Hashemi, "A 1024-element scalable optical phased array in 180 nm SOI CMOS," in IEEE International Solid-State Circuits Conference (ISSCC) Digest of Technical Papers (2017).
3. C. V. Poulton et. al. "Optical Phased Array with Small Spot Size, High Steering Range and Grouped Cascaded Phase Shifters." In Integrated Photonics Research, Silicon and Nanophotonics Optical Society of America 2016.
4. U.S. Pat. No. 9,476,981 "Optical phased arrays"

What is claimed is:

1. A device comprising:
   a plurality of tunable lasers generating a plurality of wavelengths;
   a plurality of wavelength lockers to reduce wavelength noise from the plurality of wavelengths;
   a plurality of band combiners each configured to combine a different wavelength range than other band combiners of the plurality of band combiners;
   a broadband combiner receiving outputs of the plurality of band combiners;
   a passive splitter configured to split an output of the broadband combiner; and a plurality of emitters to emit a plurality of reference wavelengths, each emitter receiving an output of the passive splitter.

2. The device of claim 1, wherein the plurality of wavelength lockers comprises a plurality of optical channel monitors located after the plurality of band combiners, and feeding back to the plurality of tunable lasers.

3. The device of claim 2, wherein each optical channel monitor of the plurality of optical channel monitor:
 comprises:
   one input configured to receive a portion of light from a tunable laser;
   an arrayed waveguide grating;
   a first photodiode outputting a first current; and
   a second photodiode outputting a second current; and
 is configured to monitor a ratio of the first current to the second current, to stabilize a target wavelength.

4. The device of claim 1, wherein each band combiner of the plurality of band combiners is configured to operate within a wavelength range of 100 nm.

\* \* \* \* \*